Oct. 10, 1944.   H. C. LIMA   2,360,146
AUTOMATIC LOADING AND UNLOADING DEVICE
Filed Jan. 28, 1942
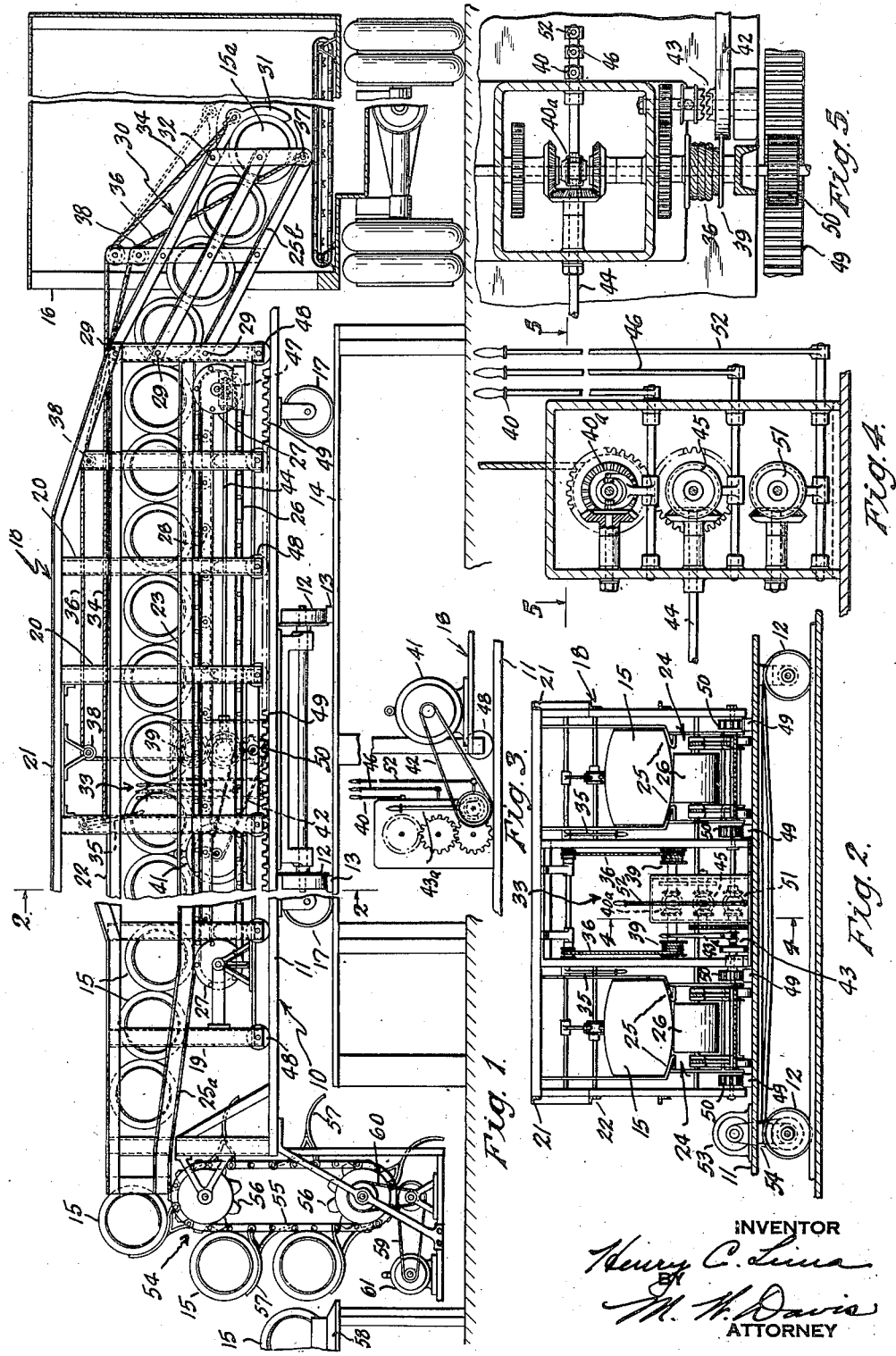
INVENTOR
Henry C. Lima
BY
M. W. Davis
ATTORNEY Patented Oct. 10, 1944

2,360,146

UNITED STATES PATENT OFFICE 2,360,146

AUTOMATIC LOADING AND UNLOADING DEVICE

Henry C. Lima, Flushing, N. Y., assignor of one-fourth to Max W. Davis, Bridgeport, Conn.

Application January 28, 1942, Serial No. 428,450

8 Claims. (Cl. 214—83)

This invention relates to a loading and unloading device for loading individual articles on a truck or other receiver, or unloading them from similar transporting or storing means, and particularly to a device for loading substantially cylindrical articles, such as large gun shells, beer kegs, and similar articles on trucks, cars, airplanes, or other receivers, or unloading them.

It has for an object to provide such a device to facilitate loading the articles on or unloading them from the truck, car, airplane or other receiver with a minimum of handling required by the men, and much more rapidly than can be done manually.

Another object is to provide a loading device which will deposit the articles in or on the receiver at the proper location desired, and may be readily shifted so as to deposit the articles in all parts of the receiver.

Another object is to provide a construction and arrangement whereby the locating, the shifting of the device, and the handling of the articles can be controlled by an operator at a control station and the various operations performed by power means.

Another object is to provide a loading device of the type indicated which is capable of receiving and holding a considerable number of the articles ready for loading and then quickly deposit them in the receiver when the latter is in readiness to receive them.

With the foregoing and other objects in view as will become apparent as the description proceeds, I have devised the construction illustrated in the accompanying drawing forming a part of this specification. It is however to be understood I am not limited to the exact arrangement and details shown but may employ various changes and modifications within the scope of the invention.

In this drawing,

Fig. 1 is a side elevation of the device shown somewhat diagrammatically and showing it in loading position;

Fig. 2 is a transverse section substantially on line 2—2 of Fig. 1;

Fig. 3 is a view of part of the operating and control mechanism;

Fig. 4 is a sectional view showing part of the control mechanism, the section being substantially on line 4—4 of Fig. 2; and Fig. 5 is a section substantially on line 5—5 of Fig. 4.

The device comprises a supporting structure 10 which may include a platform or support 11, mounted on suitable supporting wheels 12 for lateral movement, and which wheels 12 may run on rails 13 on a loading platform 14 at a storage warehouse or other location. The device is shown on the drawing as handling and loading beer kegs 15 at a brewery or storage warehouse and loading them onto a truck, such for example as one similar to that shown in my prior Patent No. 2,244,524 of June 3, 1941, but is not limited to such use or with such articles, but may be used for loading various types and kinds of articles, although the structure shown is designed primarily for substantially cylindrical articles. It is very effective and well adapted for loading such articles as large gun shells or similar substantially cylindrical articles into trucks, cars, airplanes and the like.

As the platform 11 may overhang the wheels 12 it is advisable to provide auxiliary wheels 17 adjacent the opposite ends to support them and prevent the supporting structure tipping if the load is moved to one end or the other of the platform.

Mounted to move longitudinally on the platform is a frame 18. This may be constructed in various ways but is preferably made of structural steel members including uprights 19 and 20 and longitudinal connecting members 21, 22 and 23. Extending longitudinally of the frame are two storage and conveyor means 24. In the present case each conveyor means includes a pair of tracks or guides 25 on which the substantially cylindrical articles are adapted to roll and along which they are moved by an endless belt or chain 26 running over sprockets or drums 27 at its opposite ends. The belt or chain may support a good share or any desired amount of the weight of the articles which are guided in the guideways 25, and the upper run is supported by suitable rollers 28.

If the device is designed particularly for loading the truck disclosed in my prior patent above noted which has a series of transverse compartments to receive the articles, the two conveyor means will be spaced apart a distance corresponding to the spacing of these compartments so the two of them may be loaded at the same time. The device is not however limited to this number as it may be constructed with one or more conveyor means as desired. The laterally spaced arrangement is clearly shown in Fig. 2.

At the entrance or feeding end the guides 25 are inclined downwardly and forwardly as shown at 25a so that the articles will run down by gravity toward the main part of the storage and conveyor means. At the opposite end is a discharge device 30 for directing the articles to and depositing them in the receiving means. This comprises a frame pivoted to the main frame at 29 so its free end may be raised and lowered, and the articles may roll down the lower guide or bottom portion 25b of this section which forms a continuation of the main storage and conveyor means.

At its free end is a device for controlling the discharge of articles from the device comprising a gate 31 pivoted at 32 and arranged to engage the first article 15a and hold it until this gate is raised to permit the articles to move from the device into the receiver. This gate may be controlled, that is raised and lowered, from a control station 33 on the frame structure and conveniently located between the two storage and conveyor means as shown in Fig. 2. Any suitable control may be used such as a cable 34 connected to a suitable hand lever 35 and running over guide pulleys to the gate 31.

The free end of the discharge portion 30 may be raised and lowered to dispose the articles at the proper height in the loading operation by a suitable lifting mechanism. That shown comprises a pair of cables 36 connected to the section at 37 and running over suitable guide pulleys 38 to drums 29 the operation of which is controlled by a suitable lever 40 through a suitable reversing drive and clutch mechanism 40a, using power from a motor 41 (such as an electric motor) mounted on the frame. A suitable chain or belt 42 may run from this motor to the drive and controlled by a clutch 43 (Fig. 5) operated by a lever 43a. Power may be taken from this drive for operating the discharge device 30, the conveyor belt or chain 26, and the shifting means for the frame structure 18 presently to be described, and all controlled from the control station 33.

For operating the belt or chain 26 there is a shaft running from reversing clutch mechanism 45 at the control station operated by lever 46. The other end of the shaft is geared at 47 to the shaft for one of the drums or sprockets 27.

For shifting the frame structure 18 longitudinally on the supporting structure it is mounted on wheels or rollers 48 running on the platform 11, and mounted on this platform are a series of racks 49 with which mesh gears 50 carried by the frame and operated from motor 41 through a reversing clutch mechanism 51 at the control station operated by lever 52. By this mechanism the frame structure 18 with the articles to be loaded and the conveyor means can be shifted toward or from the truck or other receiver 16 to properly locate the discharge device 30 to deposit the articles as desired in the receiver.

Means also may be provided to shift the loader laterally on the platform 14, such for example as an electric motor 53 mounted on the platform 11 and connected by a chain or belt drive 54 with the wheels 12. It can be controlled from the control station 33 with the other devices through a suitable and well known type of control mechanism, not shown.

The articles to be loaded may be placed on the storage and conveyor means directly from a platform or runway, or there may be provided an elevating and feeding device 54. That shown is mounted on the supporting structure 10 so as to move with it and comprises an elevator 55 comprising chains running over upper and lower sprockets 56 and carrying cradles 57 for receiving the articles from a supply 58. One of the sprockets may be driven by a belt or chain drive 59 and 60 from an electric motor 61 which may also be controlled from the control station 33 or other location. This elevator will receive the articles 15 from the supply 58 and raise them and deposit them on the portion 25a of the conveyor means at the free end thereof.

It will be seen from the above description the device may be filled with the articles to its capacity, which may be made as desired by making the device of the proper length, and then from the control station the operator can shift the device to the proper loading position with respect to the receiver and then deposit the articles in this receiver and arrange them as desired. It can be similarly operated for unloading articles.

This can be done with minimum handling by operatives and with a minimum of manual labor, obviating the necessity of lifting or carrying the articles by the men.

Having thus set forth the nature of my invention what I claim is:

1. A loading and unloading device for substantially cylindrical articles comprising a supporting structure mounted for lateral movement, a frame mounted for longitudinal movement on said structure having supporting guides running longitudinally to hold a number of said articles, said guides adapted to receive the articles at one end, means at the other end of the guides for depositing said articles in a receiver, conveyor means for shifting the articles along said guides to said latter means, means for shifting the frame longitudinally on the supporting structure, and means for operating the conveyor means.

2. A loading and unloading device for individual articles comprising a supporting structure mounted for lateral movement, a frame mounted for longitudinal movement on said structure including supporting guides running longitudinally adapted for carrying a plurality of substantially cylindrical articles and adapted to receive said articles at one end, means at the other end for depositing the articles in a receiver, a conveyor means for shifting the articles along said guides to the discharge means, means for controlling discharge of the articles from the discharge means, means for shifting the frame on the support, a control station on the support, and means at the control station for controlling the operation of the conveyor means, the discharge means, and the frame shifting means.

3. A loading and unloading device for substantially cylindrical articles comprising a supporting structure mounted for lateral movement, a frame mounted for longitudinal movements on said structure and having laterally spaced supporting guides running longitudinally to hold a number of said articles, means for feeding substantially cylindrical articles to the guides at one end, means at the other end for depositing the articles in a receiver, movable conveyor means between the guides for carrying a part of the weight of said articles and shifting the articles along the guides to the discharge means, and means for shifting the frame on the support.

4. A loading and unloading device for substantially cylindrical articles comprising a supporting structure mounted for lateral movement, a frame mounted for longitudinal movement on said structure and having supporting guides running longitudinally adapted to hold a number of said articles, said guides adapted to receive the articles at one end and permit them to roll along the guides to the other end, means to roll the articles along said guides, a pivoted extension at the other end mounted for up and down movement and arranged to direct the articles to a receiver, means on said pivoted section to control discharge of the articles therefrom, means for raising and lowering said pivoted section, a control station on said structure, means at the control station for controlling operation of the discharge means, and means for shifting the frame longitudinally on the support.

5. A loading and unloading device for substantially cylindrical articles comprising a supporting structure mounted for lateral movement, a frame mounted for longitudinal movement on said structure and having supporting guides running longitudinally to hold a number of said articles, said guides adapted to receive the articles at one end, a pivoted extension at the other end mounted for up and down movements and arranged to direct the articles to a receiver, means on said section to control discharge of articles therefrom, means for raising and lowering the pivoted section, conveyor means for shifting the articles along said guides to the pivoted section, a control station on the structure, means at the control station for controlling operation of the discharge means and the raising and lowering means, and means for shifting the frame on the support.

6. A loading and unloading device for substantially cylindrical articles comprising a supporting structure, a frame mounted for longitudinal movement on said structure, a pair of longitudinally extending article storage and conveyor means on said frame structure and spaced laterally to correspond with spaced compartments in a receiver, means for shifting the frame on the support, means at the discharge end of the conveyor means to locate the articles and control their discharge to the receiver, a control station between the conveyor means, means for operating the shifting means, the conveyor and the discharge means, and means at the control station for controlling the operating means.

7. A loading and unloading device for substantially cylindrical articles comprising a supporting structure, a frame mounted for longitudinal movement on said structure, a longitudinally extending storage and conveyor means for the articles on said frame, an elevator mounted on the support at the inlet end of said storage and conveyor means and adapted for lifting substantially cylindrical articles and depositing them on said means, a section at the other end of said storage and conveyor means forming a continuation thereof and hinged so that its free and discharge end may be raised and lowered to locate said end to discharge the articles in the location desired, means at said free end for controlling the discharge of articles therefrom, a control station on the support, means at the control station for controlling operation of the discharge means, and means for longitudinally shifting the frame structure on the support.

8. A loading and unloading device for substantially cylindrical articles comprising a supporting structure, a frame mounted for longitudinal movement on said structure, a longitudinally extending storage and conveyor means for articles on said frame, said means comprising longitudinally extending supporting guides adapted to receive articles from a supply at one end, a section at the other end of said means forming a continuation thereof and hinged so that its free and discharge end may be raised and lowered to locate said end to discharge the articles in the location desired, means at the said free end to control the discharge of articles therefrom, a control station on the support, means at the control station for controlling operation of the discharge means, and means for longitudinally shifting the frame structure on the support.

HENRY C. LIMA.